Patented Nov. 17, 1942

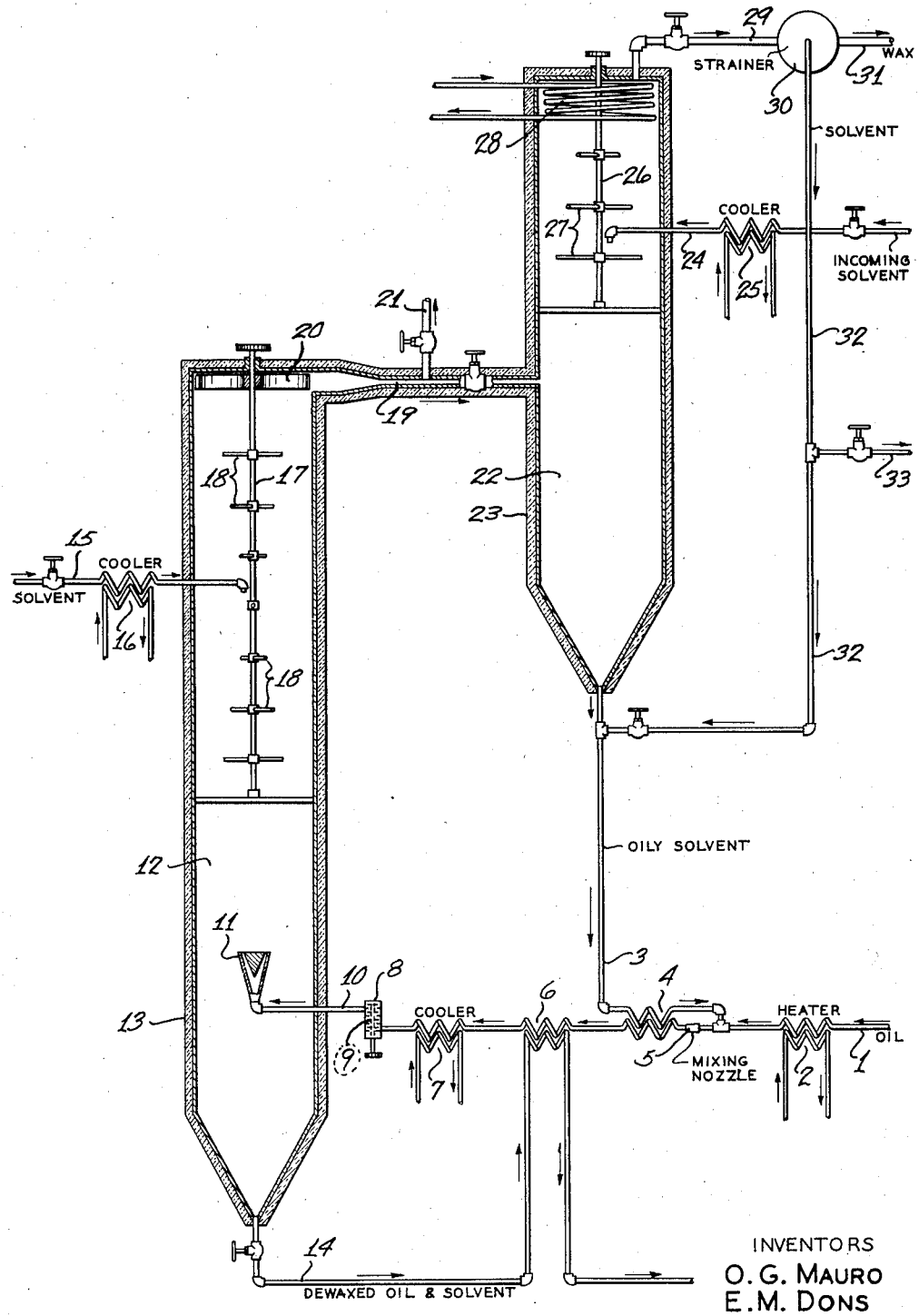

2,301,965

UNITED STATES PATENT OFFICE 2,301,965

PROCESS OF SEPARATING WAX-CONTAINING MATERIALS

Oswald G. Mauro and Eddie M. Dons, Tulsa, Okla., assignors to Mid-Continent Petroleum Corporation, Tulsa, Okla., a corporation of Delaware Application November 2, 1939, Serial No. 302,508

7 Claims. (Cl. 196—18)

This invention relates to processes of separating wax-containing materials. The invention may be employed in separating wax and oil found in various kinds of materials including mineral oils, petrolatum, slack wax and vegetable waxes. It can be conveniently used in dewaxing lubricating oils to produce low pour point lubricants, or in obtaining high melting point waxes from petrolatum, and in purifying slack wax, as well as in the treatment of other products to separate waxy materials.

Prior to this invention, the well recognized methods of separating wax involved the operations of cold settling, centrifuging or filtering to separate the wax from oil. In modern refinery practice the methods regarded as most efficient include the step of chilling a solution of oil and solvent to precipitate the wax, and thereafter passing the solution through a filter to separate the precipitated wax.

Various types of solvents have been employed in these old chilling and filtering processes, including normally gaseous and normally liquid materials which aid in the precipitation of wax and also serve as diluents during the filtering operations. However, experience has shown that each of the outstanding solvents, or diluents, is best adapted for certain types of oils, and has a relatively low degree of efficiency when used with other oils. For example, a given solvent may be quite satisfactory when used with heavy viscous oils, and considerably less efficient when used with light wax-bearing distillates, or vice versa. In actual practice, a conventional chilling and filtering plant equipped for one kind of solvent can not be readily modified to receive a different solvent. As a consequence, the same solvent is usually employed for different kinds of oil and wax, and this leads to unsatisfactory results in the ordinary commercial dewaxing plants.

Another phase of the present state of the art appears in the high cost of dewaxing equipment wherein a filtering plant is relied upon to separate the mass of precipitated wax from the diluted oil. The usual filters are quite expensive and special care and attention is required in the operation of the filtering plant. This is true when normally liquid solvents are employed, and the cost is, of course, materially increased in a plant designed for normally gaseous solvents. Aside from the expense involved in such plants, the popular solvents usually regarded as most desirable in the chilling and filtering processes, are inflammable and explosive materials requiring special precautions, and always a source of danger.

Furthermore, the filtering operations do not remove all of the oil from the wax. The large mass of precipitated wax is usually deposited on the filter in the form of clusters of interlocked wax crystals with oil-retaining cavities inside of the clusters, and additional bodies of diluted oil are trapped between the clusters on the filter. A substantial percentage of the oil is thus retained in the mass of wax.

Therefore, an object of the present invention is to generally improve this art by producing a commercially feasible process having advantages not found in the modern dewaxing processes. An object is to avoid the expense and trouble heretofore involved in the use of extremely large filters to separate the body of diluted oil from the wax, at the same time providing a less expensive system wherein the oil is more effectively removed from the wax particles. We will hereafter show how this simple system can be employed to very readily remove practically all of the oil from the wax, this being an outstanding result not obtainable from any of the modern filtering operations.

Another object is to provide a single dewaxing system adapted to very efficiently separate various different types of wax-containing materials, including viscous residues and comparatively light distillates, thereby overcoming a serious objection to the modern systems which lack the desired flexibility and fail to provide a normal efficiency or economy in dewaxing the different products.

A further object is to eliminate the necessity of using dangerous or otherwise undesirable solvents to obtain a high efficiency. We can also avoid the troublesome operating conditions, such as requirements for a critical rate of chilling, or very gradual chilling, involved in the use of some of the modern solvents. The economy of very rapid chilling and practically instantaneous precipitation of wax can be obtained in the new process.

More specifically stated, an object is to obtain all of these advantages in a very simple continuous process wherein the wax is most effectively separated and thoroughly cleansed while it is in transit from the precipitating station to a recovery station.

With the foregoing and other objects in view, the invention comprises the novel process hereinafter more specifically described and shown in the accompanying drawing, which illustrates one form of the invention. However, it is to be understood that the invention comprehends changes, variations and modifications within the scope of the claims hereunto appended.

Briefly stated, the preferred form of the invention includes the steps of precipitating the wax in a solution, extracting the main body of solution from the wax, and thereafter subjecting the wax to a cleansing operation wherein the traces or films of solution are forcibly removed from the wax.

At an initial stage the wax-bearing material may be dissolved in a solvent and then cooled to precipitate wax particles in the solution. The density of the cooled solution is preferably greater than the density of the wax particles. The viscosity of the cooled solution, and the interfacial tension existing between said wax particles and the solution, are preferably low enough to allow the wax to freely rise in the solution.

At a subsequent stage, there is a preliminary separation due to the differences in specific gravity, the relatively dense solution moving downwardly while the wax particles rise in the solution, carrying with them relatively small portions of the solution. At this stage, the rising wax particles may be surrounded by films of the oil solution, and additional portions of the solution will be distributed throughout the mass of wax particles.

This condition is preferably followed by a cleansing operation which separates oily solution from the wax particles to produce a mass of clean wax, free of the oil, etc. For example, a descending stream of oil-solvent may be transmitted through the rising mass of wax particles, so as to forcibly scrub each wax particle, thereby dissolving the oily films and removing them from the wax particles, at the same time dissolving the relatively free portions of oil or solution carried by the mass of wax. The rising wax particles are thus subjected to a most effective cleansing action, and thereafter discharged from the descending solvent. As a consequence, the wax can be obtained in a remarkably clean and pure condition, far superior to the condition of the wax obtained in the modern filtering processes.

In comparing this process with the usual filtering operation wherein a solvent is sprayed onto the wax deposited on the surface of the filter, it will be observed that the so called "wax cake" on the filter is in the form of a compact body with oil particles trapped throughout the mass of wax, and that the spray of solvent cannot effectively remove such oil. This is quite different from the cleansing action which occurs when a stream of free wax particles rises through a descending stream of oil-solvent, which flows through the spaces between the wax particles, so as to very readily dissolve the relatively free liquid between the wax particles, and exert a forcible scrubbing and dissolving action on the oily films adhering to these wax particles. Actual tests of the new dewaxing process have shown that it is feasible to remove practically all of the oil from the wax, and so far as we are aware, this result has never been accomplished in any of the prior dewaxing processes.

Furthermore, instead of subjecting the oil and wax to numerous different kinds of treatments in a series of different types of apparatus, we can accomplish all of the improved results in a simple unitary system wherein the wax is precipitated in a continuous stream of solution, and thereafter separated by gravity to provide a stream of wax particles which flow through the cleansing solution.

When a solution of wax-bearing oil and solvent is cooled to precipitate wax therein, the wax particles are usually united in the form of clusters with oil-retaining cavities therein. The specific process herein described includes the step of forcibly dividing the precipitated wax into minute particles suspended in the cold solution to form a more or less homogeneous slurry of wax and solution. The clusters are thus broken apart to release the oil solution trapped therein. An operation of this kind would be quite objectionable in the usual filtering processes which require the wax to be in a condition for efficient filtration. However, we can eliminate the special precautions ordinarily involved in filtration, and the wax can be quickly precipitated in either a liquid or solid condition and in fine or coarse particles, or any kind of cluster formation. In commercial practice this absence of special requirements is an important advantage, as it overcomes the trouble and expense of deliberately arranging for the critical operating conditions which produce readily filterable wax.

It is not necessary for us to break up the wax clusters, but this is a convenient method of releasing the oil solution trapped therein, and the resultant slurry may be readily discharged into the separating zone where the minute wax particles rise from the relatively dense solution, and pass through the cleansing zone where each minute wax particle is exposed to the forcible cleansing action of the descending solvent stream. In this manner we can positively remove and recover a substantial percentage of oil which ordinarily remains as an impurity in the wax.

It is to be understood that such unusual efficiency in removing and purifying the wax also increases the yield of dewaxed oil, and in many cases the main object is to remove and recover the optimum percentage of dewaxed oil, without resorting to expensive refining operations.

The wax may be precipitated in any desired manner and at any suitable temperature, a low temperature being required in dewaxing lubricating oils to produce low pour point lubricants, while much higher temperatures are usually desired for the precipitation of high melting point wax in petrolatum, or in the separation of high melting point wax from low melting point wax which may or may not contain a substantial percentage of oil. As previously indicated, the precipitated wax particles may be in any desired liquid or solid condition, either fine or coarse, or in the form of clusters, and the gravity separation of the wax and solution may be due to a relatively high density of the solution, or to a relatively high density of the wax particles. Advantages are gained in a true counterflow wherein a rising stream of wax particles contacts directly with a continuous descending stream of cleansing solvent, but this condition may be reversed, and various types of batch systems could be employed to obtain some of the advantages of the invention.

However, the preferred form of the invention includes the step of precipitating wax in a solution, followed by gravity separation of wax from the major portion of the solution, and then cleansing the wax particles by means of solvent which dissolves and removes undesirable portions of solution carried by the wax particles.

The cleansing operation may be carried out to any desired extent, depending upon economic conditions or the nature of the products sought in the process. In some cases, more or less of the oil may be deliberately retained in the wax, thereby reducing the time factor in the cleansing zone where the oil solution is forcibly removed from the wax particles.

In the preferred form of the invention, there is a free and comparatively rapid gravity separation of the wax from the precipitating solution, and a stream of the wax particles is thereafter transmitted through a counterflowing stream of cleansing solvent. This results in a continuous countercurrent extraction of the oil from the wax, involving a counterflow of the wax particles through the stream of cleansing solvent. To most efficiently establish these conditions, the counterflowing movements of the wax particles in the oil solution and also in the fresh cleansing solvent, should be quite positive and comparatively rapid. In this respect, the new process is extremely remote from the sluggish "cold settling" which was superseded by the filtering methods.

To most effectively establish and maintain the new combination of conditions, the nature of the solvent requires special consideration, not with the idea of producing filterable wax, but to provide for the comparatively rapid movements of the wax particles, and other conditions involved in the new process. The density or specific gravity of the solvent is an important consideration in the step of causing the rapid gravity separation of the wax from the solution, and also in the subsequent step of passing the stream of wax particles through a counterflowing stream of cleansing solution. The viscosity of the solution and cleansing solvent even at very low temperatures, is another factor that should not prevent the desired free and rapid movements of the wax particles. Another important property of the solvent relates to the interfacial tension existing between the wax particles and the oil solution, or between said wax particles and the cleansing solvent. This interfacial tension is a subject separate and distinct from the viscosity, and it should not be high enough to interfere with said free and rapid movements of the wax particles, even when the process is carried out at very low temperatures, such as 0° F., or lower. However, we will show that the invention is not limited to a particular solvent, as the various properties can be obtained from numerous different solvents.

Assuming that the object is to dewax a lubricating oil stock to produce a low cold test oil, and that the wax particles are to freely rise in a solution of the oil and solvent, the following properties are preferably present in the solvent, or solvent blend, at the optimum operating temperature:

(1) An excellent oil solvent.
(2) Low solvent power for wax.
(3) A low viscosity when containing a high percentage of oil in solution.
(4) The interfacial tension existing between the wax particles and the solvent-oil mixture must be less, as expressed in dynes per centimeter, than the work of flotation of the rising wax particles, as also expressed in dynes per centimeter.
(5) The density of the solvent-oil mixture must be high enough to provide the necessary energy differential between the interfacial tension and the buoyancy.

A single solvent having all of these properties may be employed, or the several different conditions may be obtained by using a plurality of solvents each having one or more, but not all of the desired properties. The different kinds of solvents can be selected and blended to establish all of the different conditions. For example, one solvent may be selected because it is an excellent oil solvent and provides the desired density in the solution, as set forth in the foregoing paragraphs (1) and (5), although it completely lacks or fails to most effectively provide the other properties as to rejection of wax, low viscosity and low interfacial tension described in paragraphs (2), (3) and (4). In this example, one or more additional solvents may be employed to obtain the desired low solvent power for wax, low viscosity and low interfacial tension.

To illustrate this point, we will refer to examples of solvents that may be employed in dewaxing lubricating oil stocks. The following "Example A" is an illustration of good oil solvents having high densities, but lacking the low interfacial tension and only partly providing the functions of rejecting the wax and low viscosity.

*Example A*

Methylene diacetate
Methylene dichloride
Methylene bromide
2 bromo 2 methyl propane
1 bromo-butane
2 bromo-butane
Propylene dichloride
Ethylene dichloride
Perchlorethylene
Trichlorethylene
Chloroform
Carbon tetrachloride
Carbon disulphide
1,1,2, trichlorethane
1,1,2,2, tetrachlorethane
Orthodichlorbenzene
Trichloroethanol
n. Hexyl bromide
Bromo ethane
Fluoro ethane
Dichloro difluoro methane
Dichloro fluoro methane
Bromo trichloro methane The following "Example B" illustrates solvents which may be selected to obtain a low solvent power for wax, and provide the desired low viscosity, while partly or entirely providing the low interfacial tension.

*Example B*

Methyl chloride
Acetone
Methyl ethyl ketone
Ethyl propyl ketone
Diethyl ketone
Dipropyl ketone
Di isopropyl ketone
Methyl n. propyl ketone
Methyl n. butyl ketone
Methyl n. amyl ketone
Methyl isopropyl ketone
Methyl isobutyl ketone
Methyl acetate
Methyl propionate
Ethyl acetate Ethyl propionate
n. Propyl acetate
Isopropyl acetate
Amyl acetate
Ethyl ether
Butyl ether
Isopropyl ether
Propyl aldehyde
n. Butyl aldehyde
Mesityl oxide
1,4, diethylene oxide
Diethyl carbonate
Diethyl sulphate
Ethyl chloro acetate
Methyl chloro ethanoate
Acetone dichloride
Chloro ethane The following "Example C" is an illustration of poor wax solvents that will also provide the low interfacial tension, while aiding in one or more of the other functions, but not including the low viscosity.

*Example C*

Dichlorethyl ether
Furfural
Cresylic acid
Cresol
Acrolein
Diacetone alcohol
Nitro methane
Aniline
Croton aldehyde
Benzaldehyde
Benzyl acetate
Sulphur dioxide Continuing this illustration, and assuming that one desires to obtain the additional advantage of avoiding the hazards as to fire and explosion involved in using the solvents that have become most popular in the modern filtering processes, any of the following solvent blends may be employed in the new process:

50% carbon tetrachloride and 50% acetone.
50% perchlorethylene, 40% isopropyl acetate and 10% dichlorethyl ether.

Other illustrations include methylene dichloride with acetone, or with isopropyl acetate and dichlorethyl ether. Tetrachlorethane with acetone. Trichlorethane with acetone and furfural. Ethylene dichloride with ethyl acetate and dichlorethyl ether. For convenience in commercial practice, methylene dichloride and dichlorethyl ether (chlorex) provide a desirable combination of only two solvents.

Some of these solvent combinations may be quite old in disclosures of proposed filtering processes, but it is to be understood that the present invention includes distinguishing features set forth in the claims, not in any way limited to the specific solvents which may be selected to perform the new functions. The method of operation herein disclosed is radically different from the prior dewaxing processes, particularly the filtering and centrifuging processes which succeeded the older settling processes, but in this new process, there would be no objection to the production of filterable wax, and if desired, some of the solvent-oil could be removed from the wax by filtration.

The accompanying drawing is a diagrammatical view of a system which may be employed to carry out one form of the invention.

A continuous stream of the wax-bearing charging stock, for example, a lubricating oil stock, enters the system through a pipe 1 which may be provided with a heater 2. A continuous stream of cool dewaxing solvent, from a source to be hereafter described, is conducted through a pipe 3 and heat exchanger 4 to the oil supply pipe 1. The continuous streams of heated oil and cooled solvent are united in the pipe 1 and transmitted through a mixing nozzle 5 where the oil and solvent are mixed at a temperature high enough to form the desired solution.

The continuous stream of solution is transmitted through the heat exchanger 4 where its temperature is reduced, and thence through a heat exchanger 6 for additional cooling. Thereafter, the stream of solution passes through a cooler, or chiller, 7 where the flowing solution is cooled to a temperature desired for precipitation of wax therein.

If desired, the resultant mixture of solution and precipitated wax may be transmitted into comminuting device 8 including a rotary breaker 9 whereby the wax is forcibly divided into minute particles suspended in the chilled solution to form an approximately homogeneous slurry of wax and said solution. A pipe 10 conducts a continuous stream of the wax particles and solution to a flaring discharge nozzle 11 in the lower portion of a separating chamber 12. This chamber may be in the form of an upright column covered with insulation 13.

The incoming stream of chilled solution and wax particles may be delivered to the separating chamber 12 at approximately the temperature selected for precipitation of wax in the cooler. For example, this temperature may be about 0° F., and we prefer to insulate the chamber 12 so as to maintain the desired extracting and cleansing temperatures therein, as this avoid the necessity of providing a cooling jacket around the chamber. In fact, an advantage is gained by avoiding excessive cooling of the walls of said chamber, as such cooling would tend to produce an adhesive condition in the wax at said walls, thereby interfering with the desired free movements of the wax.

We are assuming that a relatively dense solvent has been selected for this operation, and that the viscosity and interfacial tension are low enough to allow the wax particles to freely rise in the dense solution. In this event, the major portion of the dense solution will freely move downwardly to the bottom of the column where it is discharged through a pipe 14. This outgoing solution is free of wax and it can be distilled in any suitable manner to remove the solvent from the dewaxed oil. However, before leaving the dewaxing system, it can be conveniently transmitted through the heat exchanger 6 to aid in cooling the incoming solution.

Attention is now directed to the separating zone, or extracting zone established near the point where the incoming mixture of solvent and wax enters the column 12. The mass of wax particles move upwardly and carry with them portions of the solution, including oily films around the wax particles and relatively free portions of the solution between the rising wax particles. However, this rising mass enters into a relatively heavy descending stream produced by continuously introducing a stream of cleansing solvent through a pipe 15 leading into the upper portion of the column 12. This incoming cleansing solvent may pass through a cooler 16 which cools it to the desired operating temperature. It will be understood that the cleansing solvent has the previously mentioned requirements as to density, viscosity and interfacial tension, and that it will readily dissolve the oil without dissolving the wax.

Therefore, the stream of cleansing solvent will freely descend in direct contact with the rising stream of wax particles, so as to dissolve the free portions of oil solution carried by the wax, and also forcibly scrub the oily films from the rising wax particles. This action may be aided by any suitable mechanical appliance. For example, a rotary agitator 17 having arms 18 may be located in the upper portion of the column 12 to forcibly move the counterflowing streams into intersecting paths.

The velocity and time of this cleansing action may be regulated to separate all of the oil from the wax, or any desired percentage of oil may be carried along with the wax, depending upon the commercial requirements. The scrubbed wax particles are discharged in the form of a slurry through a pipe 19 leading from the top of the tower where rotary blades 20 on the shaft of agitator 17 tend to impel the slurry toward the outlet. This outgoing material can be immediately conducted to storage through a pipe 21. However, in the specific example illustrated in the drawing, the pipe 19 leads to a supplemental cleansing chamber in the form of a column 22, covered with insulation 23, and having an inlet near the top for a stream of solvent which enters through a pipe 24. This solvent conforms to the requirements heretofore pointed out, and it may be cooled by passing through a cooler or chiller 25.

The wax particles rise through the descending stream of fresh solvent in the supplemental cleansing column 22, thereby more completely washing away traces of oil carried with the wax. The descending solvent containing a small percentage of oil, can be conveniently transmitted through the pipe 3 leading from the bottom of column 22 to the incoming stream of oil in the pipe 1. The incoming fresh solvent can be thus employed to very effectively cleanse the outgoing wax before said solvent enters into the stream of incoming oil. Another advantage appears in the convenient recovery of a small percentage of valuable oil which is carried by the solvent to the incoming supply of oil.

The supplemental cleansing chamber 22 may be provided with a rotary agitator 26 having arms 27, and if desired, a heater 28 may be located in the upper end of said chamber to liquefy the outgoing wax. The use of this heater depends upon the results desired, bearing in mind that some of the solvent will pass out with the wax, and traces of oil may be found in this solvent. This outgoing wax product, while still in a cold condition can be subjected to a simple straining or filtering operation for the purpose of separating free liquid from the wax. For example, the slurry may be discharged through a pipe 29 leading to a strainer 38 where free solvent is separated from the wax product which passes out through a conductor 31 while the solvent is discharged through a pipe 32. This solvent can be conducted to storage through a pipe 33. However, it is not likely to be contaminated by any material objectionable in the process, and even if it should contain traces of oil, there would be a corresponding advantage in returning the oil to the incoming supply. Therefore, the solvent-recovery pipe 32 preferably leads to the pipe 3 which conducts the recovered solvent to the incoming stream of charging oil.

The conditions as to temperature, velocity, etc., in the supplemental cleansing column 22 can be separately regulated to accurately control the degree of cleansing, thereby providing for any desired degree of purity in the wax, and at the same time avoiding undue escape of oil which in some cases is the most valuable product. Moreover, the refining operations accurately controlled in this manner tend to reduce the total manufacturing cost of the refined oil and wax.

The temperatures in the separating zone and cleansing zones may be approximately the same as the temperature at which the wax is precipitated in the original solution, but variations in the temperatures are permissible where they do not result in objectionable changes in the condition of the wax particles.

At these temperatures, the selected wax particles are precipitated in any suitable solution having the required properties, and thereafter subjected to any suitable cleansing solvent having an affinity for the solution greater than the affinity of the wax for said solution. Furthermore, when this process is employed to dewax oils having paraffinic and naphthenic constituents, the precipitating solvent will have an affinity for the oil greater than the affinity of the wax for the paraffinic oil constituents, so as to dissolve the paraffinic oil without dissolving the paraffinic wax.

As a specific example of a process of this kind, we will refer to the dewaxing of petroleum lubricating oil wherein the solvent employed in precipitating the wax is the same as the solvent employed to cleanse the wax particles. In actual practice, it is usually most convenient to use the same solvent blend throughout the system.

Assuming that the solvent blend consists of 50% carbon tetrachloride and 50% acetone, and that the oil to be dewaxed is a waxy bright stock having a cloud point of about 70° F., a pour point of about 60° F., a viscosity of 100 at 210° F., and containing about 10% to 12% wax, we have found that the following results can be obtained.

Using one volume of oil and two volumes of precipitating solvent, and chilling the resultant solution to 0° F., the dewaxed oil had a pour point equal to or about 5° or 10° F. lower than said chilling temperature, and a cloud point below −30° F., showing that all of the objectionable wax was removed. In this specific example, the supplemental cleansing chamber 22 was not available. Two volumes of the cleansing solvent were introduced into the upper portion of a single stage cleansing zone, and the dewaxed solution consisted of about 3½ volumes of solvent with about 86% to 88% of the original waxy oil charge. The purified wax product discharged from the single stage cleansing zone amounted to about 12% to 14% of the original charge with about one-half of a volume of solvent serving as a carrier for the cleansed wax particles.

We claim:

1. In the art of separating wax from a chilled dewaxing solution containing dissolved oil and precipitated wax with portions of the dissolved oil trapped in the wax, the improvement which comprises the steps of forcibly breaking the precipitated wax into minute particles suspended in the chilled solution, thereby liberating the trapped oil solution and forming a chilled slurry of wax and said solution, transferring said chilled slurry of wax and solution into a counterflow extraction system, immediately releasing the relatively free solution from the minute wax particles near the entrance of said counterflow extracting system and allowing the released solution to freely drop by gravity from the mass of minute wax particles, so as to immediately separate dewaxed solution from the incoming wax particles, discharging said dewaxed solution from the system, transmitting a rising stream of said minute wax particles from said relatively free solution and through a cleansing zone, transmitting a descending stream of chilled oil-solvent through said cleansing zone to dissolve and scrub the oily films from said minute wax particles, and discharging the cleansed wax particles from said cleansing zone.

2. In the art of separating wax from a chilled dewaxing solution containing dissolved oil and precipitated wax with portions of the dissolved oil trapped in the wax, the improvement which comprises the steps of forcibly breaking the precipitated wax into minute particles, thereby liberating the trapped solution and forming a chilled slurry of wax and said solution, transferring said chilled slurry of wax and solution into a counterflow extraction system, releasing the relatively free solution from the minute wax particles near the entrance of said counterflow extraction system and allowing the released solution to freely drop by gravity from the mass of minute wax particles, so as to immediately separate dewaxed solution from the incoming wax particles, discharging said dewaxed solution from the system, transmitting a rising stream of said minute wax particles from said relatively free solution and through a cleansing zone, transmitting a descending stream of chilled oil-solvent through said cleansing zone to dissolve and scrub the oily films from said minute wax particles, deflecting said rising and descending streams into intersecting paths without violently disturbing the natural counterflow of said rising and descending streams, and discharging the rising wax particles from said cleansing zone.

3. The process of separating wax from oils which comprises dissolving the oil in a dewaxing solvent, the density of the solution being greater than the density of the wax, chilling the solution to precipitate the wax therein while trapping portions of the oil solution in the precipitated wax, forcibly dividing the precipitated wax into extremely minute particles suspended in the chilled solution, thereby releasing trapped oil solution from the wax and forming a chilled homogeneous slurry of wax and said solution, introducing said chilled slurry into a counterflow extracting system and allowing the major portion of said relatively dense incoming solution to immediately fall by gravity from said extremely minute wax particles, so as to immediately separate dewaxed solution from the incoming minute wax particles, discharging said dewaxed solution from the lower portion of said system, the viscosity of said chilled solution being low enough to allow the minute wax particles to freely rise therein, transmitting a descending stream of chilled oil-solvent through the rising mass of minute wax particles to dissolve and scrub the oily films from said minute particles, the viscosity of said chilled descending stream being low enough to allow the extremely minute wax particles to freely rise through the descending solvent and oil, and discharging the oil-free wax particles from the descending stream of chilled solvent.

4. In the art of separating wax and oil, the continuous countercurrent process which comprises precipitating the war in a liquid solution of the oil and a selective solvent while trapping portions of the liquid oil solution in the wax, forcibly breaking the precipitated wax into minute particles suspended in the liquid solution so as to release trapped solution into the main body of solution, introducing a continuous stream of the liquid solution and minute wax particles into an extracting zone, causing said minute wax particles to separate from the major portion of said liquid solution in said extracting zone, transmitting a continuous stream of said minute wax particles with a minor portion of said liquid solution into a countercurrent cleansing zone, transmitting a continuous stream of oil-solvent through the mass of minute wax particles in said countercurrent cleansing zone, while causing said oil-solvent and minute wax particles to flow in opposite directions in contact with each other, thereby causing the counterflowing oil-solvent to remove and dissolve minor portions of the solution adhering to the minute wax particles, and thereafter discharging said minute wax particles from said stream of oil-solvent.

5. In the art of separating wax and oil, the continuous countercurrent process which comprises precipitating the wax in a liquid solution of the oil and a selective solvent while trapping portions of said liquid solution in the wax, forcibly breaking the precipitated wax to release said trapped portions of the liquid solution into the main body of solution, introducing a continuous stream of the liquid solution and broken wax particles into an extracting zone, causing the broken wax particles to separate from the major portion of the liquid solution in said extracting zone, transmitting a continuous stream of the wax particles with a minor portion of said liquid solution into a countercurrent cleansing zone, transmitting a continuous stream of oil-solvent through the mass of wax particles in said countercurrent cleansing zone, while causing said oil-solvent and wax particles to flow in opposite directions in contact with each other, thereby causing the counterflowing oil-solvent to remove and dissolve minor portions of the solution adhering to said wax particles, and thereafter discharging said wax particles from said stream of oil solvent.

6. In the art of dewaxing lubricating oil, the continuous process which comprises chilling a liquid solution of the oil and a selective dewaxing solvent to precipitate wax in said solution, while trapping portions of the liquid oil solution in the precipitated wax, forcibly breaking said wax in the chilled solution to positively release trapped oil solution from the wax, thereby restoring trapped oil solution from the wax to the main body of solution, causing the major portion of the oil solution to separate by gravity from the broken wax particles, transmitting a continuous stream of the broken wax particles with a minor portion of said liquid solution into a countercurrent cleansing zone, transmitting a continuous stream of oil-solvent through the mass of broken wax particles in said countercurrent cleansing zone, while causing the streams of oil solvent and broken wax particles to flow in opposite directions, thereby causing the counterflowing oil solvent to forcibly remove and dissolve oil solution carried by said broken wax particles, and thereafter discharging said wax particles from said stream of oil-solvent.

7. In the art of separating oil and wax, the process which comprises maintaining a settling zone in free communication with a counterflow extraction zone, while dewaxing the oil in said settling zone and deoiling the wax in said counterflow extraction zone, said process including the steps of dissolving wax-bearing oil in a selective dewaxing solvent, cooling the solution to solidify wax in said solution, while trapping portions of the liquid oil solution in the solidified wax, forcibly breaking the wax in the cooled oil solution to liberate trapped oil solution from the wax, thereby restoring trapped liquid oil solution from the wax to the main body of cooled liquid oil solution, transmitting a mixture of the cooled liquid oil solution and broken wax particles into said settling zone, causing the major portion of said liquid oil solution to drop by gravity from the broken wax particles in said settling zone, so as to dewax said major portion of the oil solution, discharging said dewaxed solution from a lower portion of said settling zone, at the same time causing said broken wax particles with a minor portion of said solution to rise from the solution in said settling zone, transmitting said wax particles and minor portion of the solution into said counterflow extraction zone, causing the broken wax particles to rise in said counterflow extraction zone, transmitting a descending stream of relatively heavy cleansing solvent through the rising mass of broken wax particles, thereby extracting oil solution from the rising mass of wax particles, and thereafter discharging the wax from said stream of cleansing solvent.

OSWALD G. MAURO.
EDDIE M. DONS.